(12) United States Patent
Strømsvik

(10) Patent No.: US 11,355,274 B2
(45) Date of Patent: Jun. 7, 2022

(54) COMBINED SUBSEA TRANSFORMER AND COMPENSATING HV REACTOR

(71) Applicant: FMC Kongsberg Subsea AS, Kongsberg (NO)

(72) Inventor: Torbjørn Strømsvik, Asker (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 448 days.

(21) Appl. No.: 15/755,511

(22) PCT Filed: Aug. 25, 2016

(86) PCT No.: PCT/EP2016/070108
§ 371 (c)(1),
(2) Date: Feb. 26, 2018

(87) PCT Pub. No.: WO2017/032844
PCT Pub. Date: Mar. 2, 2017

(65) Prior Publication Data
US 2018/0247753 A1 Aug. 30, 2018

(30) Foreign Application Priority Data
Aug. 26, 2015 (NO) .................................. 20151084

(51) Int. Cl.
*H01F 27/08* (2006.01)
*H01F 27/16* (2006.01)
(Continued)

(52) U.S. Cl.
CPC ............. *H01F 27/16* (2013.01); *H01F 27/02* (2013.01); *H01F 27/12* (2013.01); *H01F 27/28* (2013.01);
(Continued)

(58) Field of Classification Search
USPC ............................... 336/58, 5, 55–57, 60–61
See application file for complete search history.

(56) References Cited

U.S. PATENT DOCUMENTS

| 6,867,364 | B2 * | 3/2005 | Hafskjold | ........... E21B 33/0385 174/50 |
| 2015/0016812 | A1 * | 1/2015 | Radan | ..................... F16L 53/37 392/478 |

(Continued)

FOREIGN PATENT DOCUMENTS

| EP | 2 623 838 A1 | 8/2013 |
| EP | 2 717 401 A1 | 4/2014 |

(Continued)

*Primary Examiner* — Shawki S Ismail
*Assistant Examiner* — Kazi S Hossain

(57) ABSTRACT

A subsea AC power supply device comprises a subsea transformer, having a primary winding arranged to be connected to a topside AC power supply via a subsea power supply cable, and a subsea shunt reactor, connected in parallel with the primary winding of the subsea transformer. The subsea transformer and the subsea shunt reactor are arranged within a common subsea watertight housing. A subsea AC power supply system comprises a topside AC power supply, a subsea power supply cable connected to the topside AC power supply, and a subsea AC power supply device connected to the subsea power supply cable.

15 Claims, 4 Drawing Sheets

(51) Int. Cl.
*H01F 27/02* (2006.01)
*H02J 3/18* (2006.01)
*H01F 27/12* (2006.01)
*H01F 27/28* (2006.01)
*H01F 27/32* (2006.01)
*H01F 27/40* (2006.01)
*H01F 27/42* (2006.01)

(52) U.S. Cl.
CPC ............ *H01F 27/32* (2013.01); *H02J 3/1878* (2013.01); *H01F 27/40* (2013.01); *H01F 27/42* (2013.01)

(56) References Cited

U.S. PATENT DOCUMENTS

2016/0072284 A1\* 3/2016 Stromsvik ................ H02H 7/04
  307/17
2017/0280577 A1\* 9/2017 Laneryd .................. H01F 27/14

FOREIGN PATENT DOCUMENTS

| FI | 125924 B | 4/2016 |
|----|----------|--------|
| JP | 60-30112 A | 2/1985 |
| WO | WO 2014/170320 A1 | 10/2014 |

\* cited by examiner

COMBINED SUBSEA TRANSFORMER AND COMPENSATING HV REACTOR

TECHNICAL FIELD

The invention relates to subsea power distribution, and in particular to a subsea AC power supply device and system.

More specifically, the invention relates to a subsea AC power supply device, comprising a subsea transformer, having a primary winding arranged to be connected to a topside AC power supply via a subsea power supply cable, and a subsea shunt reactor, connected in parallel with the primary winding of the subsea transformer.

The invention also relates to a subsea AC power supply system, which comprises a topside AC power supply, a subsea power supply cable connected to the topside AC power supply, and a subsea AC power supply device.

BACKGROUND

In subsea AC power supply systems, electric power with high voltage is transmitted over a long distance from a topside location to a subsea location, in order to supply a power consuming subsea processing plant. The distance may in some cases be several hundred kilometers.

Such power transmission may generate excessive capacitive current, resulting in reactive power. The power consuming subsea processing plant will often have a power factor close to 1, and thus consume very little reactive power.

A shunt reactor is an electric component which is connected in an electric power system to compensate for capacitive current, hence consuming reactive power, in the system.

SUMMARY

Disadvantages over the prior art are overcome or alleviated by means of a subsea AC power supply device and system as set forth in the claims.

The invention provides a subsea AC power supply device comprising a subsea transformer, having a primary winding arranged to be connected to a topside AC power supply via a subsea power supply cable, and a subsea shunt reactor, connected in parallel with the primary winding of the subsea transformer. Further, the subsea transformer and the subsea shunt reactor are arranged within a common subsea watertight housing.

This has the advantage of reducing the risk for damage due to leakage of seawater into the device, since the number of necessary subsea HV penetrators is reduced.

Also, installation costs and maintenance costs are reduced. In addition, the overall size and weight of the device is reduced.

In an aspect, an electrical connection between the shunt reactor and the primary winding of the transformer is included within the watertight housing.

In an aspect, the electrical connection between the shunt reactor and the primary winding of the transformer is disconnectable by a switch included within the watertight housing. This has the advantage of enabling disconnection of the shunt reactor without the need for additional subsea HV connectors, which would otherwise involve risk of leakage of seawater into the device.

In an aspect, the connection between the subsea power supply cable and the primary winding of the transformer includes a dry-mate HV penetrator which penetrates the watertight housing.

In an aspect, the watertight housing is filled with a dielectric oil. This provides for insulation and cooling of the transformer and the shunt reactor, as well as suppressing arcing in case of circuit breaking within the device.

In an aspect, the watertight housing includes first and second compartments, wherein the subsea transformer is arranged in the first compartment and the subsea shunt reactor is arranged in the second compartment, the first and second compartments being fluidly interconnected, and surrounding seawater is allowed to circulate between the first and second compartments. This has the advantage of allowing improved cooling by the circulation of seawater between the compartments, since a larger effective area of the housing will be in contact with seawater. Also, the two compartments reduce the overall volume of dielectric oil and hence the overall weight of the AC power supply device.

In such a configuration of the device, the first and second compartments may be fluidly interconnected by at least one bridge between the first and second compartments, forming a passageway which allows surrounding seawater to circulate between the first and second compartments. This has the advantage of further facilitating the cooling, since the at least one bridge enables the seawater to circulate between the first and second compartments.

In an aspect, the watertight housing includes a first and a second compartment, and the subsea transformer is arranged in the first compartment and the subsea shunt reactor is arranged in the second compartment, the first and second compartments being fluidly separated by a barrier.

In such a configuration, the first and second compartments may be interconnected by at least one bridge between the first and second compartments, forming a passageway which allows surrounding seawater to circulate between the first and second compartments, the barrier being included within the bridge.

In an aspect, the subsea AC power supply device is arranged to be connected to a topside three-phase AC power supply, wherein the subsea transformer includes three primary windings, each arranged to be connected to the topside three-phase AC power supply via the subsea power supply cable, the subsea AC power supply including three subsea shunt reactors, each connected in parallel with a corresponding primary winding of the subsea transformer, and wherein the subsea transformer and the subsea shunt reactors are arranged within the subsea watertight housing.

This has the advantage of enabling the use of the device with three-phase electrical power, which is commonly used in subsea power distribution.

The invention also provides a subsea AC power supply system, comprising a topside AC power supply, a subsea power supply cable connected to the topside AC power supply, and a subsea AC power supply device of the above-mentioned kind, connected to the subsea power supply cable.

This has the advantage of reducing the risk for damage due to leakage of seawater into the system's subsea AC power supply device, since the number of necessary subsea HV penetrators in the system is reduced. Also, installation costs and maintenance costs are reduced. In addition, the overall size and weight of the device, and thus the system, is reduced.

The invention will be described in closer detail by example, with reference to the drawings.

DETAILED DESCRIPTION

Figure 1:
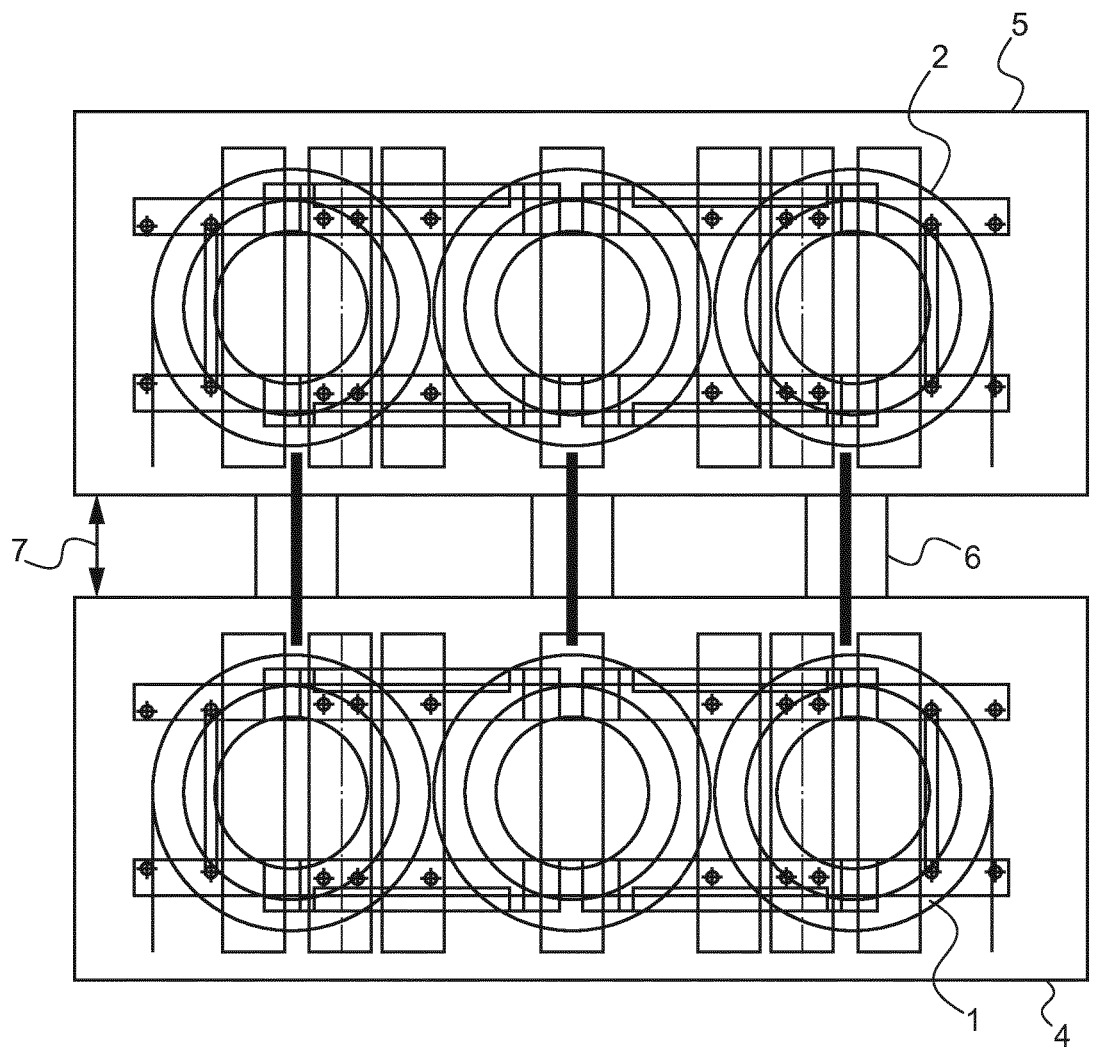
FIG. 1 is a plan view of a subsea AC power supply device.

FIG. 1 is a plan view of an exemplary subsea AC power supply device.

The subsea AC power supply device includes at least one subsea transformer 1. The illustrated subsea AC power supply device is a three-phase device, hence it includes a three-phase transformer 1.

The three-phase transformer 1 has a primary winding which may include 3 individual phase windings that are interconnected in delta (D) configuration or star (Y) configuration.

The three-phase transformer 1 also has a secondary winding that may include 3 individual phase windings that are interconnected in delta (D) configuration or star (Y) configuration.

The three-phase transformer 1 may be of the delta-delta type, with a delta configured primary winding and a delta configured secondary winding.

Alternatively, the three-phase transformer 1 may be of the star-star type, with a star configured primary winding and a star configured secondary winding.

Alternatively, the three-phase transformer 1 may be of the delta-star type, with a delta configured primary winding and a star configured secondary winding.

Alternatively, the three-phase transformer 1 may be of the star-delta type, with a star configured primary winding and a delta configured secondary winding.

Other configurations of the three-phase transformer are also possible.

In another alternative, the subsea AC power supply device may be a single-phase device. In this case, the subsea AC power supply device will include a single-phase transformer 1 which includes a single primary winding and a single secondary winding.

The transformer 1 further comprises a core of a ferromagnetic material. For instance, the core may be a laminated steel core, made of a stack of steel sheets, e.g. transformer steel sheets, or silicon electrical steel sheets. In the example of a three-phase transformer, the core may include at least three parallel limb cores arranged between a first yoke and a second yoke. The windings of the transformer may be provided around the at least three parallel limb cores. Other configurations of the core(s) and windings are possible.

The primary winding of the transformer 1 is arranged to be connected to a topside AC power supply via a subsea power supply cable (not shown).

The subsea AC power supply device further includes at least one subsea shunt reactor 2, electrically connected in parallel with the primary winding of the subsea transformer 1.

The illustrated three-phase subsea AC power supply device includes a three-phase shunt reactor 2. The three-phase shunt reactor 2 may include three individual phase windings that are interconnected in delta (D) configuration or star (Y) configuration.

Alternatively, if the subsea AC power supply device is a single-phase device, it will include a single-phase shunt reactor 2 which includes only a single winding.

The shunt reactor 2 may comprise a core of a ferromagnetic material. For instance, the core may be a laminated steel core, made of a stack of steel sheets, e.g. transformer steel sheets, or silicon electrical steel sheets. In the illustrated example of a three-phase shunt reactor, the core may include at least three parallel limb cores arranged between a first yoke and a second yoke. The windings of the shunt reactor may be provided around the at least three parallel limb cores. Other configurations of the core and windings are possible.

The subsea transformer 1 and the subsea shunt reactor 2 are arranged within a common subsea watertight housing. The watertight housing may include a first 4 and a second 5 compartment, wherein the subsea transformer 1 is arranged within the first compartment 4 and the subsea shunt reactor 2 is arranged within the second compartment 5.

Also, an electrical connection between the shunt reactor 2 and the corresponding primary transformer winding 1 is included within the watertight housing with compartments 4, 5.

The watertight housing, including its compartments 4, 5, is advantageously filled with a dielectric oil, e.g., transformer oil, silicon oil or the like. Such dielectric oils provide electrical insulation and dissipation of heat, as well as arc suppression.

In this case, the first 4 and 5 second compartments are fluidly interconnected, and surrounding seawater is allowed to circulate between the first 4 and second 5 compartments.

To achieve circulation of seawater between the first 4 and second 5 compartments, the first 4 and second 5 compartments may be fluidly interconnected by at least one bridge 6 between the first 4 and second 5 compartments. This forms a passageway which allows the surrounding seawater to circulate or pass through a water-filled space 7 provided between the first 4 and second 5 compartments.

An electrical connection between the primary winding of the transformer and the shunt reactor is provided through the bridge 6. In the illustrated example there are three bridges 6, each providing a conduit for a respective electrical connection between one individual phase winding of the primary winding of the transformer 1 to a corresponding individual phase winding of the shunt reactor 2.

In an aspect, the first 4 and second 5 compartments may be being fluidly separated by a fluid-tight barrier located within each bridge 6.

In an alternative aspect, the compartments may be fluidly interconnected through the at least one bridge 6.

Figure 2:
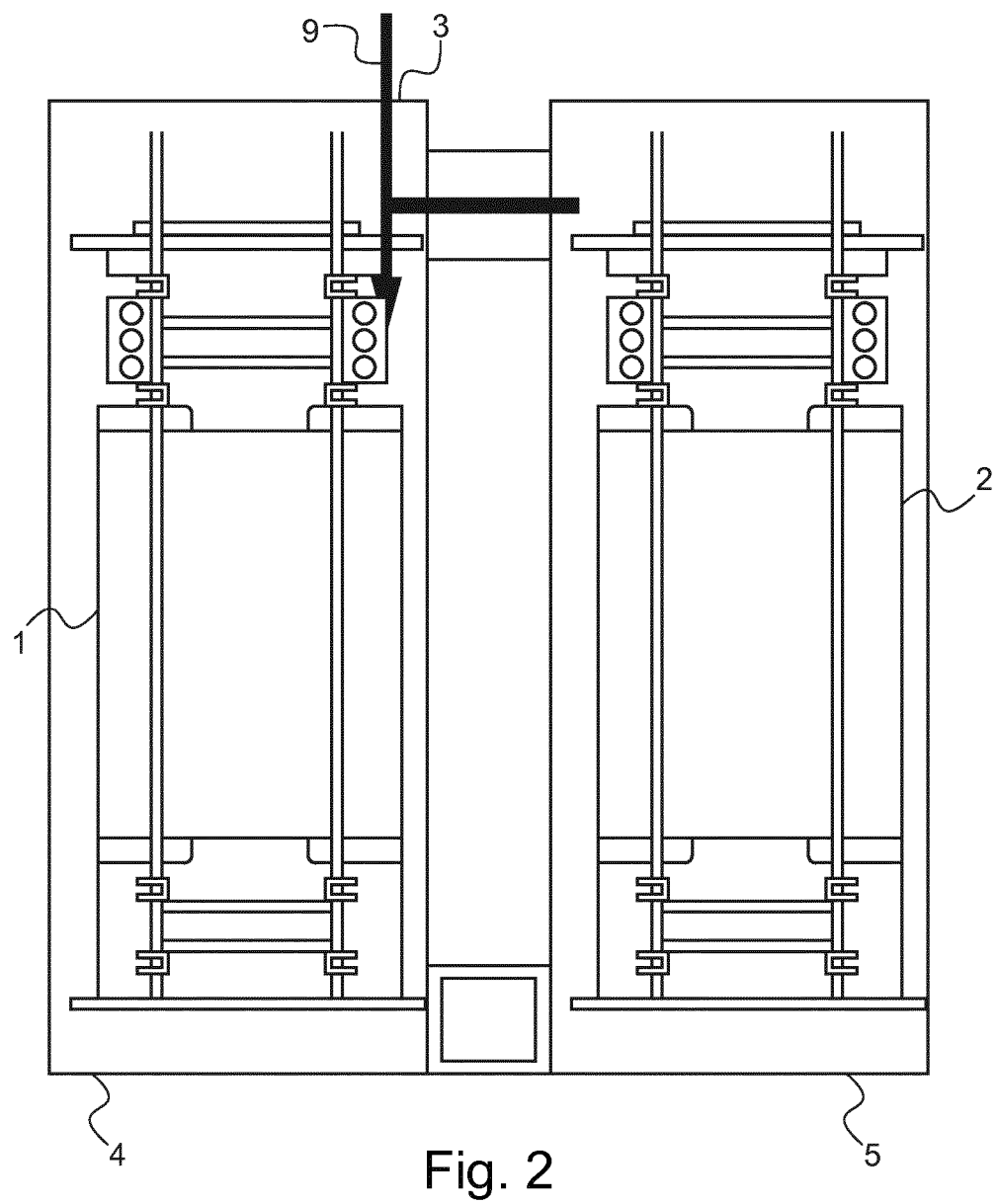
FIG. 2 is a transverse sectional view of a subsea AC power supply device.

FIG. 2 is a transverse sectional view of a subsea AC power supply device.

The transformer 1, the shunt reactor, the first 4 and second 5 compartments and other features of the AC power supply device have already been described with reference to FIG. 1 above.

FIG. 2 also shows that a connection between the subsea power supply cable 9 and the primary winding of the transformer 1 includes a dry-mate high voltage (HV) penetrator 3 which penetrates the watertight housing, in particular the first compartment 4 of the watertight housing. In an aspect, only one HV penetrator is provided.

Figure 3:
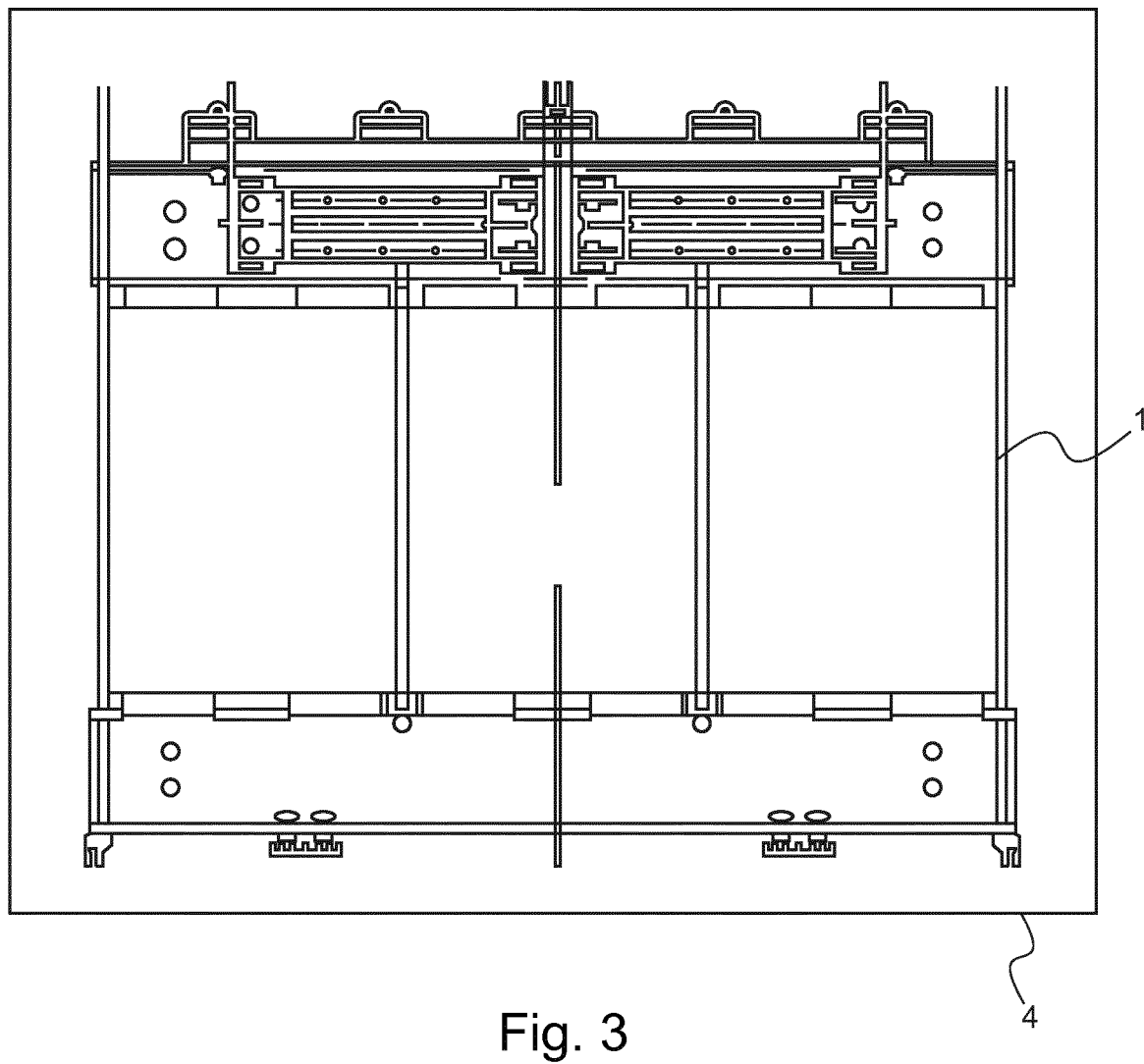
FIG. 3 is an elevation view of a subsea AC power supply device.

FIG. 3 is an elevation view of a subsea AC power supply device.

The transformer 1, the first 4 compartment of the watertight housing, shown in FIG. 3, have already been described with reference to FIG. 1 and/or FIG. 2 above. Other features of the AC power supply device have also been described with reference to FIG. 1 and/or FIG. 2.

Figure 4:
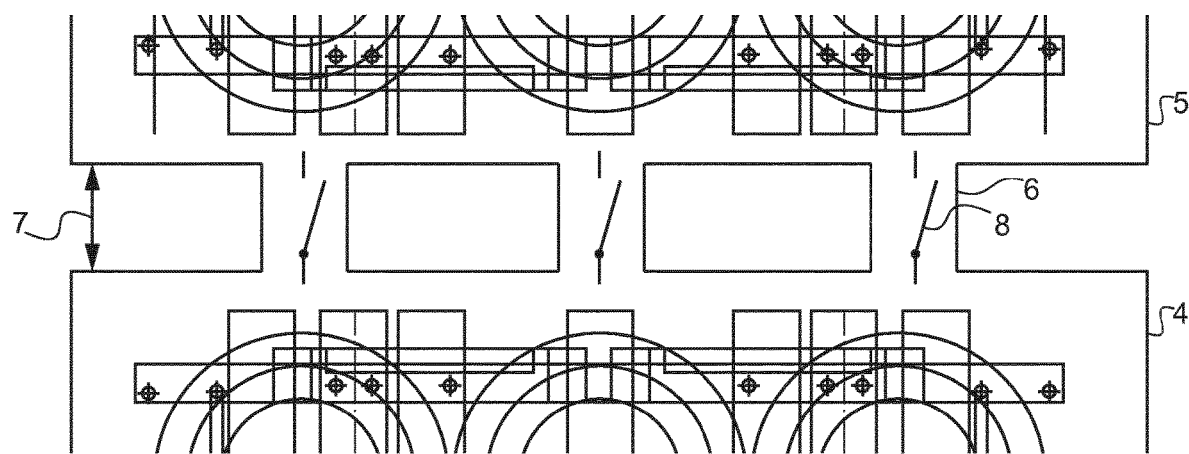
FIG. 4 is a detail of a plan view of a subsea AC power supply device.

FIG. 4 is a detail of a plan view of a subsea AC power supply device.

FIG. 4 shows the bridges 6 interconnecting the first 4 and second 5 compartments of the watertight housing. FIG. 4 also shows the electrical connection between the shunt reactor and the primary winding of the transformer that is provided through each bridge 6.

In particular, FIG. 4 shows that the electrical connection between each shunt reactor and the corresponding primary winding of the transformer 1 is disconnectable by means of a switch 8 which is included within the watertight housing. In particular, the switch 8 may be located within the bridge 6 which interconnects the first 4 and second 5 compartments of the watertight housing.

The disclosed subsea AC power supply device and system may be used when transmitting AC electric power over a distance from a topside location to a subsea location. In particular, the distance between the topside location and the subsea location may be large, such as tens of kilometers or hundreds of kilometers.

The AC power supply device and system may be arranged to supply electric power to subsea equipment such as a power consuming subsea processing plant. Such subsea equipment may include pumps, motors, valves, actuators, compressors, electric subsea control modules, etc.

The subsea AC power supply device and system may also supply power to power converting equipment such as variable speed drives, frequency converters and subsea power supplies, including transformers and rectifiers. The subsea AC power supply device and system may also supply power to subsea energy storage equipment such as rechargeable batteries.

The invention claimed is:

1. A subsea AC power supply device comprising:
   a subsea transformer having a primary winding which is arranged to be connected to a topside AC power supply via a subsea power supply cable; and
   a subsea shunt reactor which is connected in parallel with the primary winding of the subsea transformer;
   wherein the subsea transformer and the subsea shunt reactor are arranged within a common subsea watertight housing; and
   wherein the watertight housing includes first and second fluidly interconnected compartments, wherein the subsea transformer is arranged in the first compartment and the subsea shunt reactor is arranged in the second compartment, and wherein the first and second compartments are physically separated from each other so as to define a space exterior to the watertight housing which is located between the first and second compartments and through which surrounding seawater is allowed to circulate.

2. The subsea AC power supply device according to claim 1, wherein an electrical connection between the subsea shunt reactor and the primary winding of the subsea transformer is positioned within the watertight housing.

3. The subsea AC power supply device according to claim 2, wherein the electrical connection between the subsea shunt reactor and the primary winding of the subsea transformer is disconnectable by a switch which is positioned within the watertight housing.

4. The subsea AC power supply device according to claim 1, wherein the connection between the subsea power supply cable and the primary winding of the subsea transformer includes a dry-mate HV penetrator which penetrates the watertight housing.

5. The subsea AC power supply device according to claim 1, wherein the watertight housing is filled with a dielectric oil.

6. The subsea AC power supply device according to claim 1, wherein the first and second compartments are fluidly interconnected by at least one bridge which extends between the first and second compartments, the bridge forming a passageway which allows the surrounding seawater to circulate between the first and second compartments.

7. The subsea AC power supply device according to one of claims 1-5, wherein the first and second compartments are fluidly separated by a barrier.

8. The subsea AC power supply device according to claim 7, wherein the first and second compartments are interconnected by at least one bridge which extends between the first and second compartments, the bridge forming a passageway which allows surrounding seawater to circulate between the first and second compartments, and the barrier being located within the bridge.

9. The subsea AC power supply device according to claim 1, wherein the subsea AC power supply is arranged to be connected to a topside three-phase AC power supply;
   wherein the subsea transformer includes three primary windings, each of which is arranged to be connected to the topside three-phase AC power supply via the subsea power supply cable;
   wherein the subsea AC power supply includes three subsea shunt reactors, each of which is connected in parallel with a corresponding primary winding of the subsea transformer; and
   wherein the subsea transformer and the subsea shunt reactors are arranged within the subsea watertight housing.

10. A subsea AC power supply system comprising:
    a topside AC power supply;
    a subsea power supply cable having a first end which is connected to the topside AC power supply; and
    a subsea AC power supply device which is connected to a second end the subsea power supply cable, the subsea AC power supply device comprising:
       a subsea transformer having a primary winding which is arranged to be connected to the second end of the subsea power supply cable; and
       a subsea shunt reactor which is connected in parallel with the primary winding of the subsea transformer;
       wherein the subsea transformer and the subsea shunt reactor are arranged within a common subsea watertight housing;
       wherein the watertight housing includes first and second fluidly interconnected compartments, wherein the subsea transformer is arranged in the first compartment and the subsea shunt reactor is arranged in the second compartment, and wherein the first and second compartments are physically separated from each other so as to define a space exterior to the watertight housing which is located between the first and second compartments and through which surrounding seawater is allowed to circulate.

11. The subsea AC power supply system according to claim 10, wherein an electrical connection between the subsea shunt reactor and the primary winding of the subsea transformer is disconnectable by a switch which is positioned within the watertight housing.

12. The subsea AC power supply system according to claim 10, wherein the connection between the subsea power supply cable and the primary winding of the subsea transformer includes a dry-mate HV penetrator which penetrates the watertight housing.

13. The subsea AC power supply system according to claim 10, wherein the first and second compartments are fluidly interconnected by at least one bridge which extends between the first and second compartments.

14. A subsea AC power supply device comprising:
- a subsea transformer having a primary winding which is arranged to be connected to a topside AC power supply via a subsea power supply cable; and
- a subsea shunt reactor which is connected in parallel with the primary winding of the subsea transformer, the subsea shunt reactor being configured to compensate for capacitive current;
- wherein the subsea transformer and the subsea shunt reactor are arranged within a common subsea watertight housing; and
- wherein the watertight housing includes first and second fluidly interconnected compartments, wherein the subsea transformer is arranged in the first compartment and the subsea shunt reactor is arranged in the second compartment, and wherein the first and second compartments are physically separated from each other so as to define a space exterior to the watertight housing which is located between the first and second compartments and through which surrounding seawater is allowed to circulate.

15. A subsea AC power supply system comprising:
- a topside AC power supply;
- a subsea power supply cable having a first end which is connected to the topside AC power supply; and
- a subsea AC power supply device which is connected to a second end the subsea power supply cable, the subsea AC power supply device comprising:
  - a subsea transformer having a primary winding which is arranged to be connected to the second end of the subsea power supply cable; and
  - a subsea shunt reactor which is connected in parallel with the primary winding of the subsea transformer, the subsea shunt reactor being configured to compensate for capacitive current;
- wherein the subsea transformer and the subsea shunt reactor are arranged within a common subsea watertight housing;
- wherein the watertight housing includes first and second fluidly interconnected compartments, wherein the subsea transformer is arranged in the first compartment and the subsea shunt reactor is arranged in the second compartment, and wherein the first and second compartments are physically separated from each other so as to define a space exterior to the watertight housing which is located between the first and second compartments and through which surrounding seawater is allowed to circulate.

\* \* \* \* \*